United States Patent [19]

Fuller

[11] Patent Number: 5,603,890
[45] Date of Patent: Feb. 18, 1997

[54] SILVER RECOVERY UNIT

[76] Inventor: Cecil J. Fuller, 9921 Petersburg Rd., Evansville, Ind. 47711

[21] Appl. No.: 511,616

[22] Filed: Aug. 7, 1995

[51] Int. Cl.$^6$ .................................................. C22B 13/08
[52] U.S. Cl. .......................................... 266/101; 266/170
[58] Field of Search ..................................... 266/170, 101

[56] References Cited

U.S. PATENT DOCUMENTS

| | | | |
|---|---|---|---|
| 3,692,291 | 9/1972 | MacKay | 266/170 |
| 3,744,995 | 7/1973 | MacKay | 266/170 |
| 3,840,217 | 10/1974 | MacKay | 266/170 |
| 4,240,617 | 12/1980 | MacKay | 266/170 |
| 4,441,697 | 4/1984 | Peterson et al. | 266/170 |
| 4,997,166 | 3/1991 | Wiggins | 266/170 |
| 5,004,212 | 4/1991 | Gutierrez | 266/170 |
| 5,026,029 | 6/1991 | Peterson | 266/170 |
| 5,112,390 | 5/1992 | MacKay | 75/733 |
| 5,229,009 | 7/1993 | Woog | 210/719 |
| 5,310,629 | 5/1994 | McGluckin et al. | 266/170 |
| 5,472,176 | 12/1995 | Azzara | 266/170 |

FOREIGN PATENT DOCUMENTS 0128225  7/1985  Japan .

*Primary Examiner*—Scott Kastler
*Attorney, Agent, or Firm*—Stephen R. Greiner

[57] ABSTRACT

A silver recovery unit for precipitating silver from photographic solutions and the like. The silver recovery unit is provided with a container having an inlet and an outlet. Positioned within the container is a silver reduction assembly including a hollow coil of screen material formed of metal that is above silver in electromotive force series. A tubular insert, in fluid communication with the container outlet, extends from the axial flow passage of the hollow coil to an elevation adjacent the top of the container. A orifice plate is secured within the tubular insert for controlling the flow of silver bearing liquid through the silver reduction assembly.

12 Claims, 1 Drawing Sheet

SILVER RECOVERY UNIT

FIELD OF THE INVENTION

The present invention relates generally to apparatus for the recovery of silver as a free metal from depleted photographic processing liquids and the like.

BACKGROUND OF THE INVENTION

Various silver salts are utilized in the development of photographic films and papers. These salts, dissolved or suspended in a liquid, are progressively depleted and replenished during well-known image fixing steps carried out in a largely mechanized fashion. Excess silver-bearing liquid is drained into waste holding tanks for later disposal.

Most sewage treatment agencies consider silver suspended in photographic and other liquids to be a hazardous material. Therefore, silver-bearing liquids must be treated to remove substantially all of their silver content before the liquid may be discharged into municipal sewage treatment systems. The concentration of silver permitted to remain in the discharged liquid varies, but generally must fall below 5 parts per million. Many municipalities, nevertheless, require a lower concentration of silver in a liquid destined for sewer disposal.

A wide variety of apparatus have been developed to remove silver from silver bearing liquids so as to permit disposal into a municipal sewer system. It is now standard in the photographic processing industry, however, to use a mass of steel wool or screen material positioned in a canister to induce ion exchange reactions that precipitate silver from silver bearing liquids supplied to the canister. Unfortunately, these canisters have not been altogether satisfactory during use.

Due to the relatively low concentrations of silver found in the liquids typically processed in canisters such as those described above, ion exchange reactions occur at a relatively slow rate. Thus, controlling the amount of time that a silver bearing liquid is in contact with the ferrous ion source is of critical importance. This contact time has, however, been difficult to regulate as degradation of the ferrous ion source during use often leads to wide variations in liquid flow rates through the canister. Total fluid blockages, causing uncontrolled spills of silver bearing liquid, also occur from time to time. A need, therefore, exists for a silver recovery unit capable of effectively recovering silver from a silver bearing liquid in a controlled manner.

SUMMARY OF THE INVENTION

In light of the deficiencies presented by the prior art silver recovery apparatus, it is a principal object of the present invention to provide a silver recovery unit utilizing ion exchange reactions for effectively processing and recovering silver as a free metal from a silver bearing liquid at a predetermined rate.

It is an additional object of the invention to provide a silver recovery unit of the type described having means for preventing the uncontrolled overflow of silver bearing liquid therefrom should the unit become inadvertently clogged or the delivery of silver bearing liquid to the unit exceed its capacity.

It is another object of the invention to provide a silver recovery unit that draws silver bearing liquid substantially into the center of a hollow coil of screen material formed of metal that is above silver in electromotive force series so as to maximize the contact time of the silver bearing liquid with the screen material.

It is an object of the invention to provide improved elements and arrangements thereof in a silver recovery unit for the purposes described which is inexpensive, dependable and fully effective in accomplishing its intended purposes.

Briefly, the silver recovery unit in accordance with this invention achieves the desired objects by featuring a closed container having an inlet and an outlet. Positioned within the container is a silver reduction assembly including a hollow coil of screen material preferably formed of a steel alloy flashed in copper. The hollow coil has top and bottom surfaces and an axial flow passage connecting the top and bottom surfaces. A tubular insert, in fluid communication with the outlet, extends from the axial flow passage to an elevation adjacent the top of said container. A plate having an orifice is secured within the tubular insert for controlling the flow of silver bearing liquid through the silver reduction assembly. The hollow coil acts in the manner of a filter to prevent debris from undesirably clogging the orifice.

The foregoing and other objects, features and advantages of the present invention will become readily apparent upon further review of the following detailed description of the preferred embodiment, as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
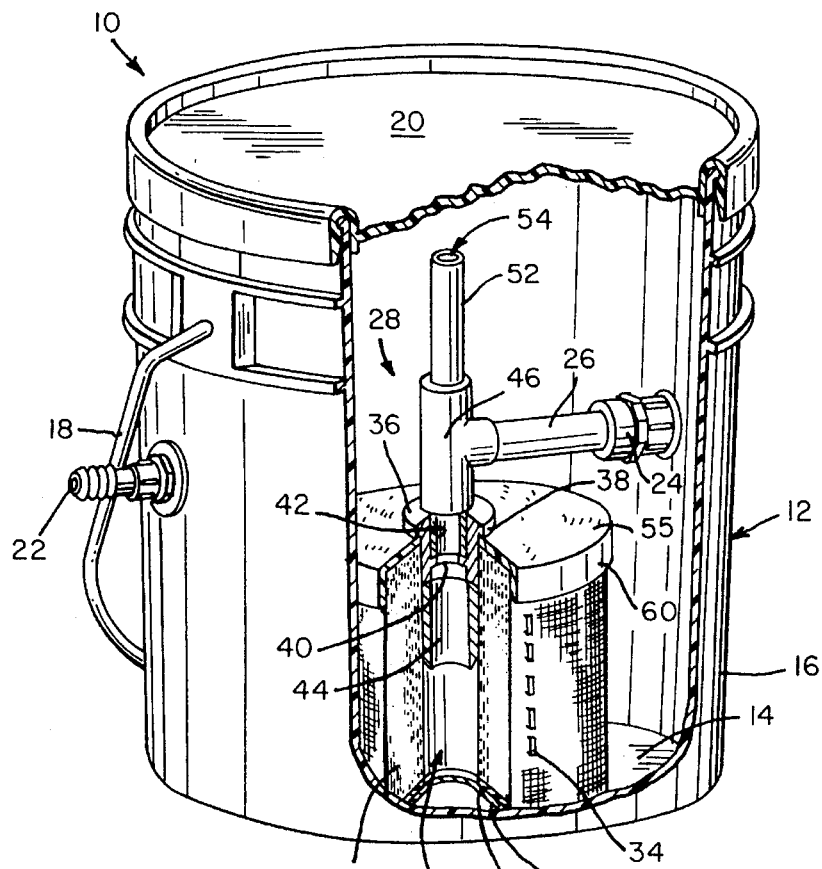
FIG. 1 is a perspective view with parts broken away for clarity of illustration of a silver recovery unit in accordance with the invention.

Referring now to FIG. 1, a silver recovery unit in accordance with the present invention is shown generally at 10. As illustrated, the silver recovery unit 10 preferably includes a container 12 having a circular bottom wall 14 and a cylindrical side wall 16 integrally formed therewith. For ease of transport, a pivoting handle 18 is secured to the side wall 16 in conventional fashion. A press-fit lid 20, engageable with the top of the side wall 16, is also provided for pouring off excess liquid while preparing the unit 10 for shipment to a processor. Preferably, both the container 12 and its lid 20 are formed of a chemically inert plastic material such as polyethylene.

At a suitable distance above the bottom wall 14, the side wall 16 is provided with a liquid inlet 22 for introducing silver bearing liquid into the container 12 as well as a liquid outlet 24 for withdrawing treated liquid from the container during use. So that multiple silver recovery units 10 can be readily positioned in side-by-side fashion and connected in series, if desired, the liquid inlet 22 and liquid outlet 24 are preferably located on opposite sides of the container 12 at equal elevations above the bottom wall 14.

The liquid outlet 24 is connected through a lateral discharge conduit 26 to a silver reduction assembly 28 positioned within the interior of the container 12. Preferably, the silver reduction assembly 28 includes a radially permeable, wound coil 30 of woven metallic screen material. As shown, the coil 30 defines a hollow cylinder having a central axial flow passage 32 connecting the top and bottom surfaces thereof.

The coil 30 is formed by wrapping a length of screen material about a cylindrical mandrel or like device until it has a suitable outside diameter less than that of the inside diameter of the cylindrical side wall 16. With the screen thus wound into a hollow cylinder, it is preferably prevented from unwinding by the insertion of several staples 34 into the coil 30 along the free edge of the screen. With the mandrel removed, the coiled screen can be cut into sections having a length preferably somewhat less than the distance from the bottom wall 14 of the container 12 to the bottom of liquid inlet and outlet 22 and 24.

The screen material utilized to form the coil 30 is comprised of a metal above silver in the electromotive force series such as copper, lead, nickel and iron. Because of their relatively low cost and nontoxic nature, it has been found that iron alloys covered with a thin protective layer of copper are well suited to this use. The copper covering is preferably provided to inhibit oxidation of the underlying iron alloy by air prior to use of the unit 10. Such oxidation has been found to substantially decrease the effectiveness of the coil 30 in recovering silver, especially during the initial start-up of a unit 10. Nevertheless, any suitable material may be utilized to form the coil 30.

Cemented within the top of the axial flow passage 32 by a bead of a silicon rubber sealant composition (not shown) is a tubular insert comprising an adapter fitting 36 sized to closely engage the inside surface of the coil 30. To secure the adapter fitting 36 against continued downward movement into the axial flow passage 32, the top of the adapter fitting 36 is provided with an integral, outwardly extending, peripheral flange 38. At a fixed distance from the outwardly extending flange 38, the adapter fitting 36 is also provided with an inwardly extending, peripheral flange 40 which serves as a seat for a tubular coupling member 42 inserted into the adapter fitting 36.

The tubular insert also comprises a tubular extension member 44 secured with a suitable adhesive cement to the bottom of the adapter fitting 36. As shown, the extension member 44 is sized to closely engage the inside surface of the coil 30 and provide a bottom opening for receiving silver bearing liquid proximate the center of the coil, so as to maximize the radial flow potential for the coil. A sump is defined beneath the extension member 44 in the axial flow passage 32 for the collection of sludge and other particulate matter so that liquid flow into the extension member 44 is not restricted at its bottom opening.

A tee fitting 46 snugly engages the coupling member 42 and is in fluid communication with the axial flow passage 32 so that silver bearing liquid may flow from the coil 30 outwardly through the lateral discharge conduit 26 and liquid outlet 24. Preferably, a circular plate 48 having a central orifice 50 is clamped between the coupling member 42 and tee fitting 46 to limit the liquid flow rate from the coil 30. The generally vertically flowing liquid passing through the orifice 50 is redirected in the tee fitting 46 to a substantially horizontal course for flow through the lateral discharge conduit 26 toward the liquid outlet 24.

Inserted into the open top of the tee fitting 46 is a tubular overflow member 52 having an opening 54 positioned adjacent the lid 20. The overflow member 52 serves to establish a maximum liquid level in the container 12 several inches above the nominal liquid level defined by the height of the liquid outlet 24. Thus, the preferred container 12 has the ability to store one or more gallons of silver bearing liquid therein during silver bearing liquid processing operations. Should the silver reduction assembly 28 become plugged and maximum liquid level be exceeded, however, excess silver bearing liquid will drain into the overflow member 52 for discharge from liquid outlet 24. Unprocessed silver bearing liquid entering the overflow member 52 is largely prevented from entering the coil 30 by orifice plate 48. The overflow member 52 also serves as an antisiphoning feature.

The components comprising the tubular insert are preferably formed of a synthetic resinous material such as polyvinyl chloride (PVC) known to be chemically inert when exposed to conventional silver bearing liquids. Specifically, these components include: overflow member 52, tee fitting 46, extension member 44, coupling member 42, adapter fitting 36 and lateral discharge conduit 26. Of course, said components are connected as described in detail above, and adhesively secured together, where appropriate, by one of any number of suitable adhesive cements.

To cause an essentially radial flow pattern of the silver bearing liquid through the coil 30, acrylic latex caulk, inert to silver bearing solutions, is used to seal the top and bottom surfaces of the coil by respectively providing impervious caps 55 and 56 thereto. As shown, acrylic latex caulk is also preferably applied to the upper portion of coil side wall 58 to form an impervious ring or band 60 integral with the upper cap 55. It is believed that the band 60 aids in diverting the flow of silver bearing solution downwardly away from the top surface of the coil 30 thereby reducing the likelihood of liquid channeling adjacent the cap 55.

Secured to the bottom surface of the coil 30, by the caulk utilized in forming the cap 56, is an impervious plastic disk 62. In addition to closing the bottom of the axial flow passage 32 in the coil 30, the disk 62 also provides some structural integrity to the coil after the processing of substantial volumes of silver bearing liquid. Thus, the silver reduction assembly 28 can be removed from the container 12 more readily for refining at a processing facility.

Figure 2:
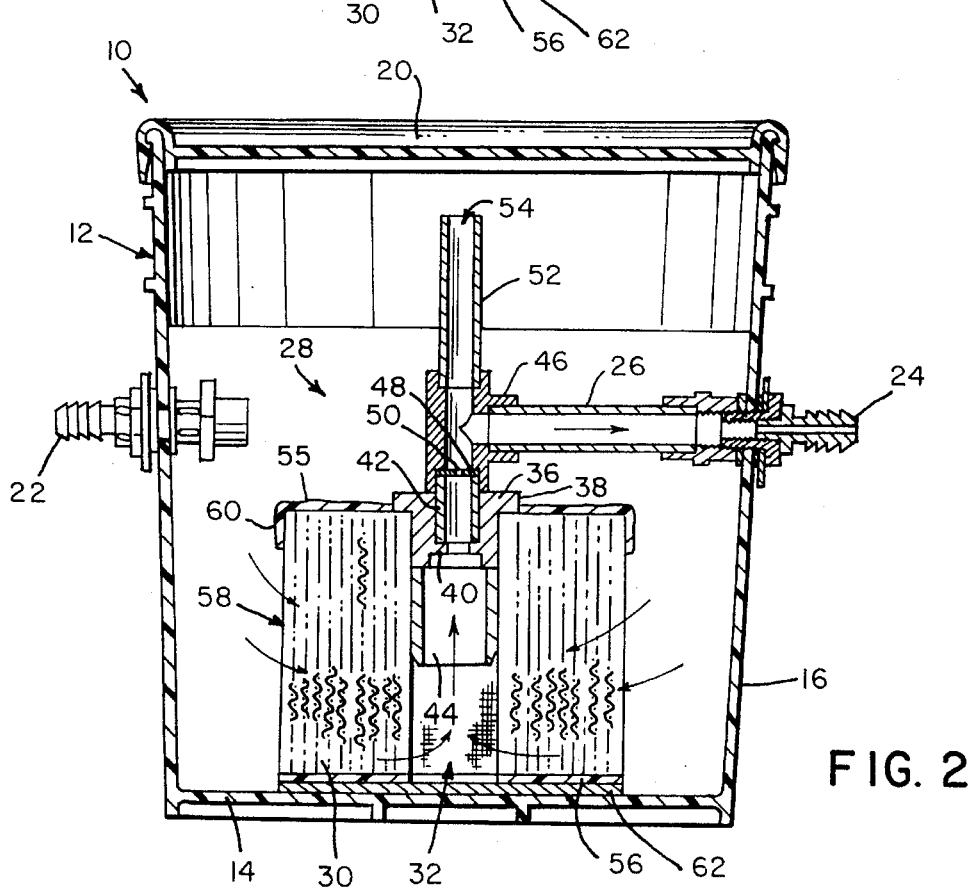
FIG. 2 is a longitudinal cross sectional view of the silver recovery unit of FIG. 1.

To use the silver recovery unit 10, silver bearing liquid is first introduced into the interior of the container 12 via the liquid inlet 22. With the fluid level elevated above the liquid outlet 24 as shown in FIG. 2 resulting from the initial influx of silver bearing liquid, a portion of the contained liquid is then forced under the influence of a slight hydrostatic head through the coil 30 of the silver reduction assembly 28 where silver ions in the liquid undergo exchange reactions with the ferrous ions of the coil. The silver is, thus, precipitated from the liquid in the form of a thin coating upon the exposed screen material of the coil 30 and a dense sludge that accumulates in the sump portion of the axial flow passage 32 in the coil. The processed liquid then flows in controlled fashion through the orifice 50 to the liquid outlet 24 and is discharged into a municipal sewer system. Later, the silver containing precipitate and sludge is removed from the container 12 and reduced to elemental silver by conventional refining processes.

While the invention has been described with a high degree of particularity, it will be appreciated by those skilled in the art that numerous modifications and substitutions may be made thereto. Therefore, it is to be understood that the present invention is not limited to the sole embodiment described above, but encompasses any and all embodiments within the scope of the following claims.

I claim:

1. A unit for the recovery of silver as a free metal from silver bearing liquid, comprising:

a container having an inlet and an outlet; and, a silver reduction assembly positioned within said container, said silver reduction assembly including:

a hollow coil of screen material formed of metal that is above silver in electromotive force series, said hollow coil having top and bottom surfaces and an axial flow passage connecting said top and bottom surfaces;

a tubular insert extending from said axial flow passage to an open end at an elevation adjacent the top of said container, said tubular insert further being in fluid communication with said outlet; and a plate having an orifice secured within said tubular insert for controlling the flow of silver bearing liquid, introduced into said container through said inlet, through said silver reduction assembly and discharged from said outlet.

2. The silver recovery unit according to claim 1 wherein said silver reduction assembly further includes an impermeable cap formed of non-reactive caulk secured to each of said top and bottom surfaces to provide an essentially radial flow pattern for silver bearing liquid through said hollow coil.

3. The silver recovery unit according to claim 2 wherein said silver reduction assembly further includes an impermeable plastic disk secured to said bottom surface of said coil for closing the bottom of said axial flow passage.

4. The silver recovery unit according to claim 1 wherein the bottom of said tubular insert is proximate the midpoint of said axial flow passage.

5. The silver recovery unit according to claim 1 wherein said screen material is formed of a steel alloy flashed with copper to prevent oxidation in air.

6. A unit for the recovery of silver as a free metal from silver bearing liquid, comprising:

a container having an opening at one end thereof and a lid for selectively closing said opening;

a liquid inlet in said container;

a liquid outlet in said container;

a source of iron ions within said container for reacting with silver bearing liquid to exchange silver ions in the silver bearing liquid for iron ions from said source of iron ions so that silver is recovered within said container from the silver bearing liquid;

a tee fitting having first, second and third open ends, said first open end secured to said iron ion source so as to be in fluid communication with the interior of said iron ion source, said second open end in fluid communication with said liquid outlet, and said third open end disposed adjacent said lid; and, a plate having an orifice secured within said tee fitting for controlling the flow of silver bearing liquid through said source of iron ions.

7. The silver recovery unit according to claim 6 wherein said source of iron ions includes a hollow coil of screen material formed of a steel alloy flashed with copper, said hollow coil having top and bottom surfaces and an axial flow passage connecting said top and bottom surfaces.

8. The silver recovery unit according to claim 7 wherein said hollow coil further includes an impermeable cap formed of nonreactive caulk secured to each of said top and bottom surfaces to provide an essentially radial flow pattern for silver bearing liquid through said hollow coil.

9. The silver recovery unit according to claim 8 wherein said hollow coil further includes an impermeable plastic disk secured to said bottom surface for closing the bottom of said axial flow passage.

10. The silver recovery unit according to claim 7 further comprising a tubular extension member secured to the bottom of said tee fitting, the bottom of said tubular extension member being proximate the midpoint of said axial flow passage.

11. A silver recovery unit, comprising:

a container having an opening in the top thereof and a lid for selectively closing said opening;

a liquid inlet in said container;

a liquid outlet in said container;

a silver reduction assembly positioned within said container, said silver reduction assembly including:

a hollow coil of screen material formed of metal that is above silver in electromotive force series, said hollow coil having top and bottom surfaces and an axial flow passage connecting said top and bottom surfaces;

a tubular insert, in fluid communication with said outlet, extending from said axial flow passage to an elevation adjacent said lid;

an impermeable cap formed of non-reactive caulk secured to said top surface;

an impermeable plastic disk secured with non-reactive caulk to said bottom surface for closing the bottom of said axial flow passage; and, a plate having an orifice secured within said tubular insert for controlling the flow of silver bearing liquid through said silver reduction assembly.

12. The silver recovery unit according to claim 11 wherein the bottom of said tubular insert is proximate the midpoint of said axial flow passage.

* * * * *